(12) United States Patent
Bi et al.

(10) Patent No.: US 11,868,315 B2
(45) Date of Patent: Jan. 9, 2024

(54) METHOD FOR SPLITTING REGION IN DISTRIBUTED DATABASE, REGION NODE, AND SYSTEM

(71) Applicant: Huawei Cloud Computing Technologies Co., Ltd., Gui'an New District (CN)

(72) Inventors: Jieshan Bi, Shenzhen (CN); Hao Fang, Shenzhen (CN); Chaoqiang Zhong, Shenzhen (CN); Yijun Guo, Shenzhen (CN)

(73) Assignee: Huawei Cloud Computing Technologies Co., Ltd., Gui'an New District (CN)

( * ) Notice: Subject to any disclaimer, the term of this patent is extended or adjusted under 35 U.S.C. 154(b) by 1392 days.

(21) Appl. No.: 15/960,167

(22) Filed: Apr. 23, 2018

(65) Prior Publication Data

US 2018/0239780 A1    Aug. 23, 2018

Related U.S. Application Data

(63) Continuation of application No. PCT/CN2016/080144, filed on Apr. 25, 2016.

(30) Foreign Application Priority Data

Nov. 11, 2015    (CN) .......................... 201510767508.9

(51) Int. Cl.
*G06F 16/17*    (2019.01)
*G06F 16/23*    (2019.01)
(Continued)

(52) U.S. Cl.
CPC ............ *G06F 16/173* (2019.01); *G06F 3/061* (2013.01); *G06F 16/23* (2019.01); *G06F 16/28* (2019.01); *G06F 16/901* (2019.01)

(58) Field of Classification Search
None
See application file for complete search history.

(56) References Cited

U.S. PATENT DOCUMENTS

| 7,299,239 B1 | 11/2007 | Basu et al. |
| 8,930,312 B1 | 1/2015 | Rath et al. |

(Continued)

FOREIGN PATENT DOCUMENTS

| CN | 102890678 A | 1/2013 |
| CN | 104133867 A | 11/2014 |

(Continued)

OTHER PUBLICATIONS

Wen AnYu, Dissertation for the Master Degree of Engineering "DHT Based Key-Value Distributed Storage System," Master of Engineering, Communication and Information System, Shenzhen Graduate School, Harbin Institute of Technology, Dec. 2010, 61 Pages.

(Continued)

*Primary Examiner* — Alex Gofman
*Assistant Examiner* — Umar Mian
(74) *Attorney, Agent, or Firm* — Slater Matsil, LLP (57) ABSTRACT

In an embodiment, a first region is set according to a preset condition, the first region is a blank region reserved for storing new data of a key-value type. An embodiment method includes: when the new data of the key-value type is to be stored in the first region, receiving a region split command; updating, according to the region split command, a state identifier of the first region and in a state table to an identifier indicating that a read/write service is no longer provided, splitting the first region into at least two second regions, updating state identifiers of the second regions in the state table to identifiers indicating that a read/write (Continued)

service can be provided; and recording, in a metadata table, storage location information of the second regions.

19 Claims, 10 Drawing Sheets

(51) Int. Cl.
*G06F 16/901* (2019.01)
*G06F 16/28* (2019.01)
*G06F 3/06* (2006.01)

(56) References Cited

U.S. PATENT DOCUMENTS

| | | | | |
|---|---|---|---|---|
| 9,052,831 | B1* | 6/2015 | Stefani | G06F 3/065 |
| 9,208,032 | B1* | 12/2015 | McAlister | G06F 11/1471 |
| 9,223,517 | B1* | 12/2015 | Srivastav | G06F 3/065 |
| 9,460,185 | B2* | 10/2016 | Swift | G06F 16/278 |
| 9,971,526 | B1* | 5/2018 | Wei | G06F 3/064 |
| 2003/0163509 | A1* | 8/2003 | McKean | G06F 9/5027 |
| | | | | 718/100 |
| 2004/0243618 | A1* | 12/2004 | Malaney | G06F 16/22 |
| | | | | 707/999.102 |
| 2009/0055616 | A1* | 2/2009 | Kishi | G06F 3/061 |
| | | | | 711/171 |
| 2011/0107053 | A1* | 5/2011 | Beckmann | G06F 3/0683 |
| | | | | 711/E12.001 |
| 2011/0196866 | A1 | 8/2011 | Cooper | |
| 2011/0246503 | A1* | 10/2011 | Bender | G06F 9/546 |
| | | | | 707/769 |
| 2012/0109892 | A1 | 5/2012 | Novik et al. | |
| 2012/0290582 | A1 | 11/2012 | Oikarinen | |
| 2013/0238584 | A1 | 9/2013 | Hendry | |
| 2014/0130175 | A1 | 5/2014 | Ramakrishnan | |
| 2015/0127658 | A1* | 5/2015 | Ding | G06F 16/2255 |
| | | | | 707/747 |
| 2016/0350302 | A1* | 12/2016 | Lakshman | G06F 16/9014 |
| 2017/0103039 | A1* | 4/2017 | Shamis | H04L 67/1097 |

FOREIGN PATENT DOCUMENTS

| | | |
|---|---|---|
| CN | 104331478 A | 2/2015 |
| CN | 104503966 A | 4/2015 |
| CN | 104881466 A | 9/2015 |
| CN | 105354315 A | 2/2016 |
| WO | 2013147785 A1 | 10/2013 |

OTHER PUBLICATIONS

Zhao, "Range Query Techniques Based on Key-Value Storage in DHT," China Academic Journal Electronic Publishing House, TP311. 13, 2013, 64 pages.

Hao Hu, "Research on Accelerating Technique for Key-Value Data Storage," Thesis—Degree of Master of Engineering in Computer Science and Technology, Graduate School of National University of Defense Technology, Changsha, Hunan, P.R. China, Nov. 2012, 61 pages.

* cited by examiner

METHOD FOR SPLITTING REGION IN DISTRIBUTED DATABASE, REGION NODE, AND SYSTEM

CROSS-REFERENCE TO RELATED APPLICATIONS

This application is a continuation of International Application No. PCT/CN2016/080144, filed on Apr. 25, 2016, which claims priority to Chinese Patent Application No. 201510767508.9, filed on Nov. 11, 2015. The disclosures of the aforementioned applications are hereby incorporated by reference in their entireties.

TECHNICAL FIELD

The present invention relates to the database field, and in particular, to a method for splitting a region in a distributed database, a region node, and a system.

BACKGROUND

In most distributed databases, a key-value type storage manner is generally used. That is, data that a user wants to store is stored in a value part, and a key corresponding to a value is built. When the user searches for the value, the user searches for the corresponding value by using a key index. When being stored, the data is naturally sorted in a lexicographical order of keys.

Figure 1:
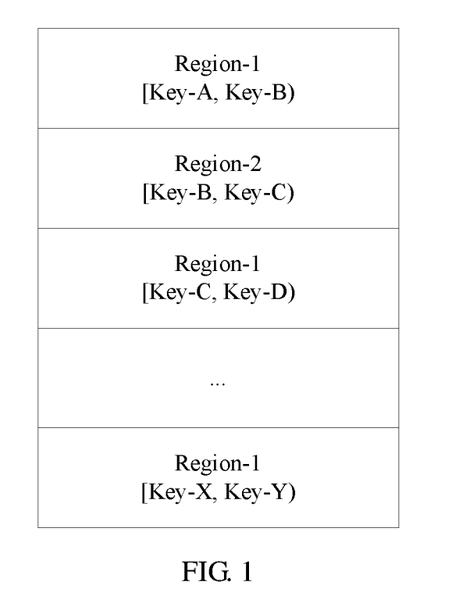
FIG. 1 is a schematic diagram of a region in a user table.

The data is stored in a corresponding user table (Table) created by the user. A table may store a large amount of data. To facilitate distributed management and maintenance, the table may be split in a lexicographical order of recorded key values to generate one or more regions (Region). Each region is a set of data in one key interval, that is, a set of data in consecutive rows. A key corresponding to each key value is included in only one region interval. For example, as shown in FIG. 1, FIG. 1 is a schematic diagram of a region in a user table. A Key-A in a Region-1 in FIG. 1 represents a small value in a lexicographical order, and a Key-Y in a Region-M represents an large value in the lexicographical order.

Figure 2:
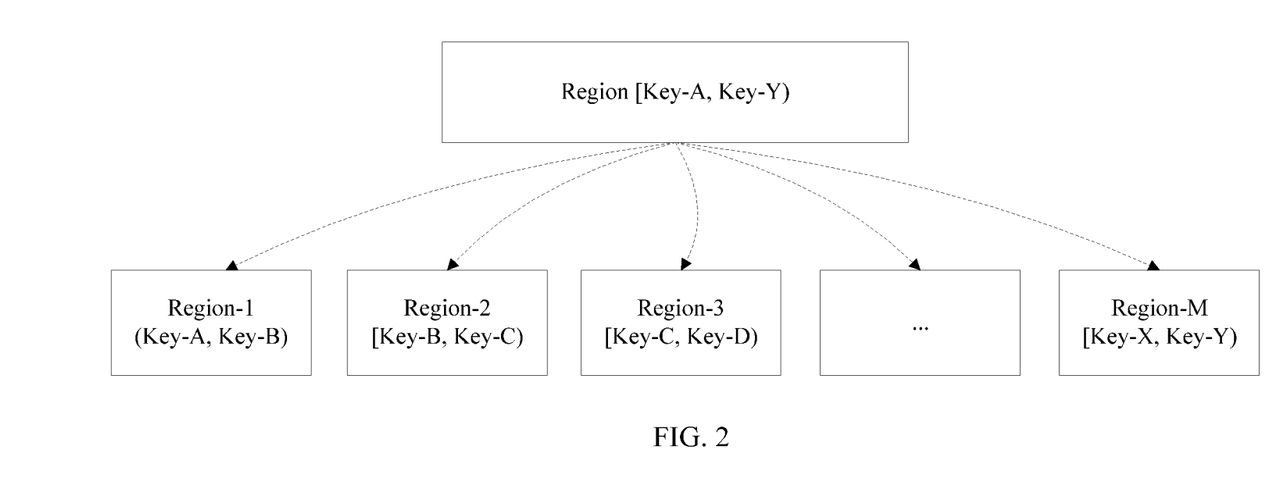
FIG. 2 is a schematic split diagram of splitting one region in a user table into multiple regions.
Figure 3:
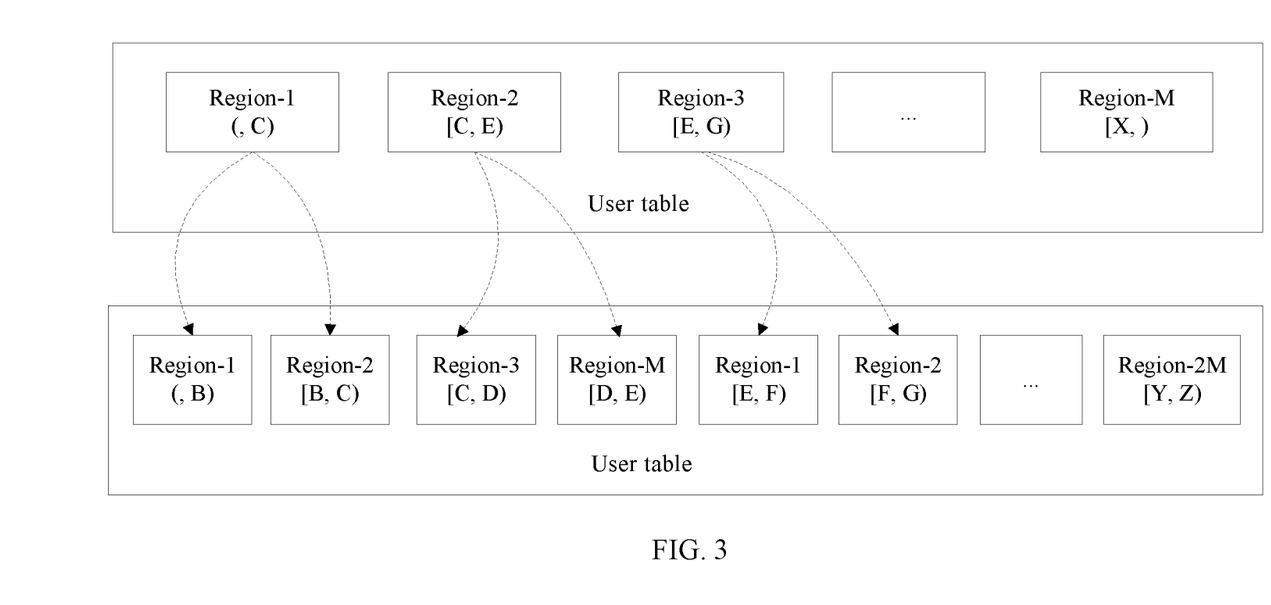
FIG. 3 is a schematic split diagram of splitting each region in a user table into two regions.

Currently, there are two region split forms. In a first form, a split point (Split Points) is preset at a preliminary stage of table creation, and a region is split into new regions according to the preset split point. For example, as shown in FIG. 2, a Region [Key-A, Key-Y) is created during table creation, preset split points are {B, C, . . . , X}, and the Region [Key-A, Key-Y) is automatically split into multiple regions: a Region-1 [Key-A, Key-B), a Region-2 [Key-B, Key-C), a Region-3 [Key-C, Key-D), . . . , and a Region-M [Key-X, Key-Y) according to the preset split points. In a second form, when data stored in a region reaches a specific memory, the region is automatically split into two regions, or a user manually triggers region splitting. For example, as shown in FIG. 3, FIG. 3 is a schematic diagram of splitting one region into two regions. A Region [, C), a Region [C, E), a Region [E, G), . . . , and a Region [X,) each are split into two regions, and the Region [, C), the Region [C, E), the Region [E, G), . . . , and the Region [X,) are split into a Region [, B), a Region [B, C), a Region [C, D), a Region [D, E), a Region [E, F), a Region [F, G), . . . , a Region [X, Y), and a Region [Y, Z) in sequence. When a user table includes multiple regions, the regions may be split in the second split manner, so that data read/write performance is improved.

However, it is assumed that a split point preset at a preliminary stage of table creation is improper. For example, split points determined during table creation are {a, b, c, d, e, f}, and regions based on these split points are (−∞, a), [a, b), [b, c), [c, d), [d, e), [e, f), and [f, +∞). After running for a period of time, it is found that the original split points are improper, and more proper split points should be {g, h, i, j, k, l, m}, but there is user data in the original regions. In this case, region splitting is performed, and data in a file is read and then stored in two or more files. As a result, region split speed is low, and data read/write performance is relatively poor. If region splitting is performed more frequently, the data read/write performance is worse, and data distribution is still uneven in split regions.

SUMMARY

Embodiments of the present disclosure provide a method for splitting a region in a distributed database, a region node, and a system. A region is reserved in a user table, and the region remains as a blank region during current data storage. When data needs to be stored in the region, the region is split, so that rapid multi-point splitting of the region in the user table is implemented, and read/write performance of the user table is improved.

According to one aspect, an embodiment of this application provides a method for splitting a region in a distributed database. When data is stored in a key-value type storage manner, according to a preset condition such as a service type, a key value range of data stored according to a current service type is pre-estimated and a blank region is set. The blank region is a blank region reserved for storing new data of a key-value type. That is, currently stored data is not stored in the blank region. The method includes: when the data stored in the key-value type is to be stored in the blank region, receiving a region split command. The region split command may be an interface or a command invoked by a user, and the region split command includes split point information of splitting of the blank region. The method further includes updating, according to the region split command, a state identifier of the blank region in a state table to an identifier indicating that a read/write service is no longer provided. The identifier may be understood as an identifier indicating that provision of a read/write service is not supported. The method further includes splitting the blank region into two or more new regions according to the split point information of the blank region, and recording state identifiers of the newly generated regions in the state table as identifiers indicating that a read/write service can be provided. The identifiers may be understood as identifiers indicating that provision of a read/write service is supported. The method further includes instructing to record, in a metadata table, location information of a region node (or a storage node) on which the newly generated regions are stored, so that the user obtains, according to the location information that is recorded in the metadata table and of the region node on which the newly generated regions are located, data stored in the newly generated regions.

Based on the foregoing solution, the region is reserved in a user table, and the region remains as a blank region during current data storage. When the data is to be stored in the region, the region is split, and the data is stored after the splitting is completed, so that rapid multi-point splitting of the region in the user table is implemented, and read/write performance of the user table is improved.

In a possible design, when the region split command is received, information that indicates that the blank region starts to split is sent to a shared state machine. When receiving the information, the shared state machine updates the recorded state identifier of the blank region to an identifier indicating that the blank region starts to split, so that a service status of the region is made clear, and therefore, a data loss caused when data is written into the blank region is avoided.

In another possible design, after the splitting of the region is completed, information that indicates that the splitting of the blank region is completed is sent to the shared state machine. When receiving the information, the shared state machine updates the recorded state identifier of the blank region to an identifier indicating that the splitting of the blank region is completed, so that a status of the blank region is made clear, and therefore, a data loss is avoided by forbidding data from being written into the blank region.

In still another possible design, when the blank region is split into the at least two new regions, updating of a status that is of the blank region in the metadata table to an identifier indicating that provision of a read/write service is not supported is instructed, so that the service status of the blank region can be obtained by querying the metadata table, where the service status of the blank region is used to delete information about the blank region during subsequent storage space cleanup.

In another aspect, an embodiment of this application provides a region node. When data is stored in a key-value type storage manner, according to a preset condition such as a service type of to-be-stored data, a key value range for data storage is pre-estimated and a blank region is set. Currently stored data is not stored in the blank region. The region node includes a receiving unit, an update unit, a splitting unit, and a recording unit. When new data of a key-value type is to be stored in the blank region, the receiving unit receives a region split command. The region split command may be an interface or a command invoked by a user, and the command includes split point information of the blank region. The update unit updates, according to the region split command, a state identifier of the blank region in a state table to an identifier indicating that a read/write service is no longer provided, that is, provision of a read/write service is not supported. The splitting unit splits the blank region into two or more new regions according to the split point information, and records state identifiers of the new regions as identifiers indicating that a read/write service can be provided. The identifiers may be understood as identifiers indicating that provision of a read/write service is supported. The instruction recording unit records, in a metadata table, location information of a region node (or a storage node) on which the new regions are located, so that data stored in the new regions can be obtained by querying for the location information of the new regions that is recorded in the metadata table.

Based on the foregoing solution, a region is reserved in a user table, and the region remains as a blank region during current data storage. When the data is to be stored in the region, the region is split, and the data is stored after the splitting is completed, so that rapid multi-point splitting of the region in the user table is implemented, and read/write performance of the user table is improved.

In a possible design, the region node further includes a sending unit, configured to send, to a shared state machine, information indicating that the blank region starts to split. When receiving the information, the shared state machine updates the state identifier of the blank region to an identifier indicating that the splitting starts, so as to avoid a data loss caused when data is written into the blank region.

In another possible design, after the splitting of the region is completed, the sending unit sends, to the shared state machine, information that can indicate that the splitting of the blank region is completed. When receiving the information, the shared state machine updates the recorded state identifier of the blank region to an identifier indicating that the splitting of the blank region is completed, so that a status of the blank region is clear, and therefore, a data loss is avoided by forbidding data from being written into the blank region.

In still another possible design, the update unit is instructed to update a state identifier that is of the blank region and that is in the metadata table to an identifier indicating that provision of a read/write service is not supported, so that a service status of the blank region can be obtained by querying the metadata table, where the service status of the blank region is used to delete information about the blank region during subsequent storage space cleanup.

In still another aspect, an embodiment of this application provides a system. The system includes multiple management nodes and a shared state machine. The multiple management nodes can manage one or more region nodes in the another aspect, so that a first region is set according to a preset condition when data is stored in a key-value type storage manner, the first region is a blank region reserved for storing new data of a key-value type, and when the new data of the key-value type is to be stored in the first region, splitting of the first region is completed by using the at least one region node, the multiple management nodes, and the shared state machine.

According to the method for splitting a region in a distributed database, the region node, and the system provided in this application, the region is reserved in the user table, and the region remains as a blank region during current data storage. When the data is to be stored in the region, the region is split, and the data is stored after the splitting is completed, so that rapid multi-point splitting of the region in the user table is implemented, and read/write performance of the user table is improved.

BRIEF DESCRIPTION OF THE DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DETAILED DESCRIPTION OF ILLUSTRATIVE EMBODIMENTS

Embodiments of the present disclosure are applied to a distributed database, and data is generally stored in a key-value (KeyValue) type storage manner.

The following clearly describes the technical solutions in the embodiments of the present disclosure with reference to the accompanying drawings in the embodiments of the present disclosure.

Figure 4:
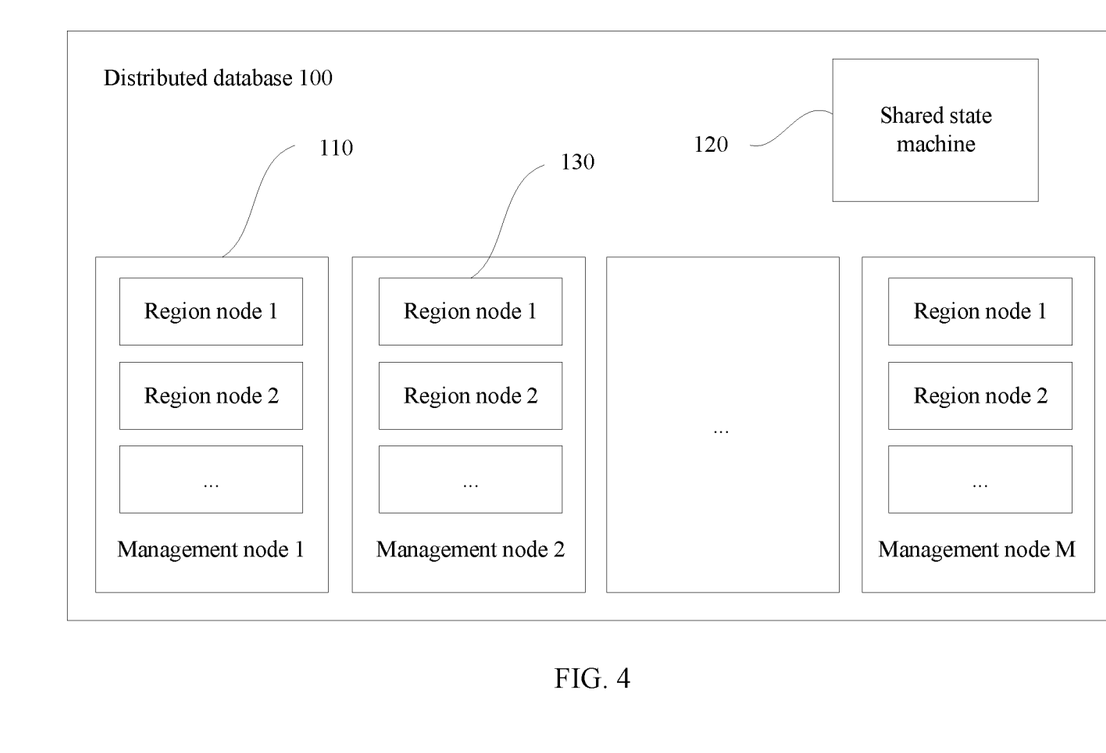
FIG. 4 is a distributed database according to an embodiment of the present disclosure.

FIG. 4 is a distributed database according to an embodiment of the present disclosure. The distributed database may also be referred to as a "system". The distributed database 100 may include multiple management nodes 110 and a shared state machine 120. Each management node manages one or more region nodes 130 (RegionServer), and each region node is usually one physical server. Each region node includes at least one region and a state table. Each region is used to store data. The state table is used to record a status of each region. For example, the region is in a state in which provision of a read/write service is supported, or the region is in a state in which provision of a read/write service is not supported. The shared state machine is a management node for an entire range of a cluster, and may be configured to record the status of each region, so that another management node in the distributed database learns of the status of each region (e.g., each region node 130). For example, status of each region can indicate that the region is in a splitting state or that the region is in a split state.

A first region is first reserved when a user creates a user table and performs region division. Data is not stored in the first region during current data storage. The first region may be reserved according to a type of data that the user wants to store. For example, when all currently stored data is data of a "type A", a key value range for storage of the data of this type is pre-estimated, and a blank region is reserved for another type of data that may be stored later, for example, data of a "type B", a "type C", or another type. When the data of the "type B", the "type C", or the another type is to be stored, the blank region is split into a quantity of regions, so that data read/write performance of the user table is improved.

Figure 5:
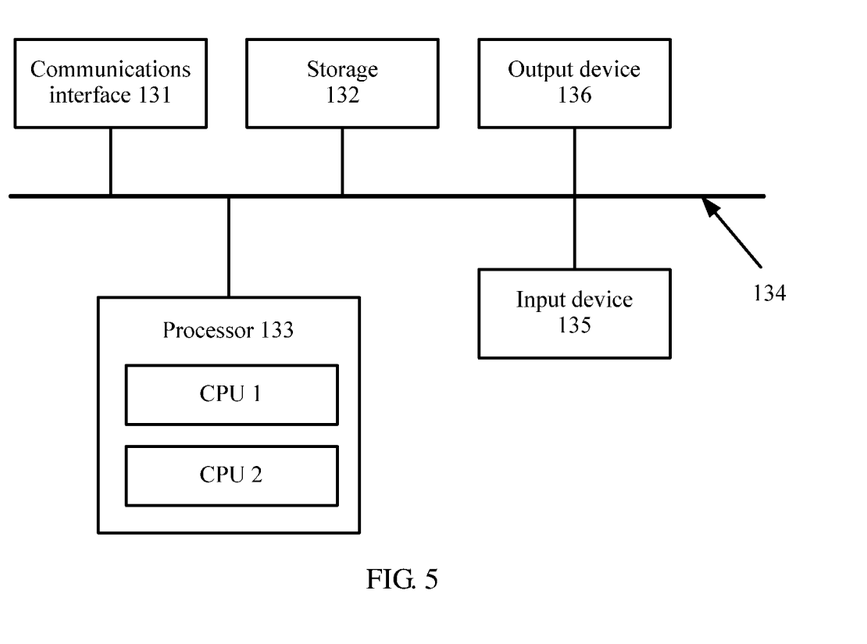
FIG. 5 is a schematic structural diagram of a region node according to an embodiment of the present disclosure.

FIG. 5 is a schematic structural diagram of a region node according to an embodiment of the present disclosure. As shown in FIG. 5, the region node is the region node 130 shown in FIG. 4. The region node 130 includes a communications interface 131, a memory 132, a processor 133, and a bus 134. The communications interface 131, the memory 132, and the processor 133 are connected and communicate with each other by using the bus 134. The communications interface 131 is configured to receive a signal input by an external device, or send a corresponding instruction to an external device. The memory 132 is configured to store an instruction and data. The processor 133 is configured to invoke the instruction in the memory, and execute a corresponding operation.

In this embodiment of the present disclosure, the processor 133 may be a central processing unit (CPU), or the processor 133 may be another general-purpose processor, a digital signal processor (DSP), an application-specific integrated circuit (ASIC), a field programmable gate array (FPGA), another programmable logic device, a discrete gate or transistor logic device, a discrete hardware component, or the like. The general-purpose processor may be a microprocessor, or the processor may be any conventional processor or the like.

The bus 134 may include a power bus, a control bus, a status signal bus, and the like, in addition to a data bus. However, for clarity of description, various buses are marked as the bus 134 in the figure.

The memory 132 may include a read-only memory and a random access memory, and provides an instruction and data for the processor 133. A part of the memory may further include a non-volatile random access memory. For example, the memory may further store information about a device type.

As shown in FIG. 5, the region node 130 may further include an input device 135 and an output device 136, for example, a keyboard and a display. The input device 135 is configured to input a related instruction or related information to the region node. The output device 136 is configured to output corresponding information to an external device.

Figure 6:
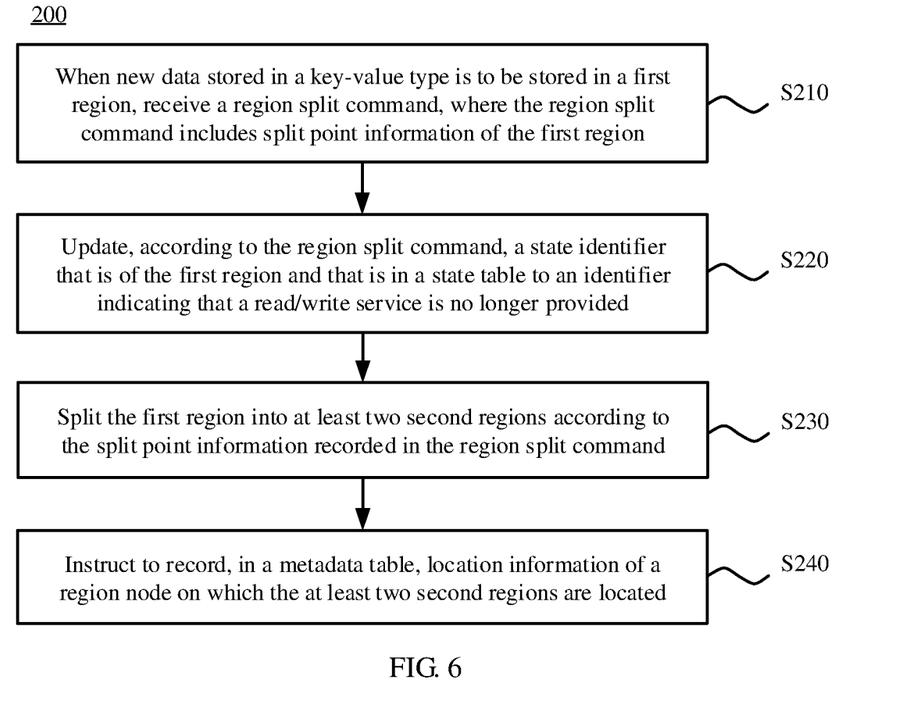
FIG. 6 is a flowchart of a method for splitting a region in a distributed database according to an embodiment of the present disclosure.

FIG. 6 is a flowchart of a method for splitting a region in a distributed database according to an embodiment of the present disclosure. As shown in FIG. 6, the method 200 for splitting a region is performed by the region node 130 in FIG. 4 or FIG. 5. The method 200 includes the following steps.

Step S210. When new data stored in a key-value type is to be stored in a first region, receive a region split command, where the region split command includes split point information of the first region.

Step S220. Update a state identifier of the first region in a state table to a first identifier according to the region split command. The first identifier is used to indicate that the first region no longer provides a read/write service.

Step S230. Split the first region into at least two second regions according to the split point information recorded in the region split command, and record state identifiers of the second regions in the state table as second identifiers, where the second identifiers are used to indicate that the second regions can provide a read/write service.

Step S240. Instruct to record, in a metadata table, location information of a region node on which the at least two second regions are located, so that the region node on which the second regions used to store the new data are located can be found according to the metadata table.

Specifically, in S210, the first region is a blank region reserved when a user performs region division. When reserving the blank region, the user may pre-estimate, according to a type of currently stored data, a key value range during data storage, so as to ensure that the currently stored data does not fall into the blank region.

When data is to be stored in the blank region, the region node triggers, according to an interface or a command invoked by the user, the blank region to split into multiple regions according to preset multiple split points (Split Points), where the command is the region split command. The region split command includes the split information of the blank region. The split point is set according to a key value point for data storage. For example, if a key value range of the region is from 1 to 9, split points may be set to 3 and 6.

In step S220, the region node may include the state table, and the state table is used to record a status of each region in the region node. For example, a region is in a state in which provision of a read/write service is supported, or a region is in a state in which provision of a read/write service is not supported. The region node changes, according to the split information of the blank region, the state identifier that is of the blank region and that is in the state table into an identifier indicating that provision of a read/write service is not supported. For example, Table 1 is a schematic structural diagram of a state table according to an embodiment of the present disclosure.

TABLE 1

| Region | State identifier |
|---|---|
| Region 1 | Do not support provision of a read/write service |
| Region 2 | Support provision of a read/write service |
| Region 3 | Support provision of a read/write service |

It should be understood that, in this embodiment of the present disclosure, content in Table 1 is only intended to describe the technical solution in detail, and the state identifiers in Table 1 may be indicated in another logical indication manner. For example, "0" is used to indicate that provision of a read/write service is not supported, and "1" is used to indicate that provision of a read/write service is supported. This is not limited in this embodiment of the present disclosure.

It should be further understood that, in this embodiment of the present disclosure, the region node records a state identifier of each region in a form of the state table. In this embodiment of the present disclosure, the region node may record status information of each region by using another logical relationship. This is not limited in this embodiment of the present disclosure.

In this embodiment of the present disclosure, the region node changes the state identifier of the blank region into the identifier indicating that provision of a read/write service is not supported, so that a service status of the blank region is clear inside the region node, and a data loss caused when data is written into the blank region in a split process of the blank region is avoided.

In step S230, the second regions are new regions obtained after the region node splits the region according to the split point information of the blank region and a preset split point. The user usually presets multiple split points, and splits the blank region into two or more new regions, so as to improve data read/write performance.

The newly generated regions are recorded in the state table, and the state identifiers of the newly generated regions are recorded as identifiers indicating that provision of a read/write service is supported, so that specific service statuses of the multiple newly generated regions are clearly learned of. This helps store data in the newly generated regions, and improves data read/write performance.

Figure 7:
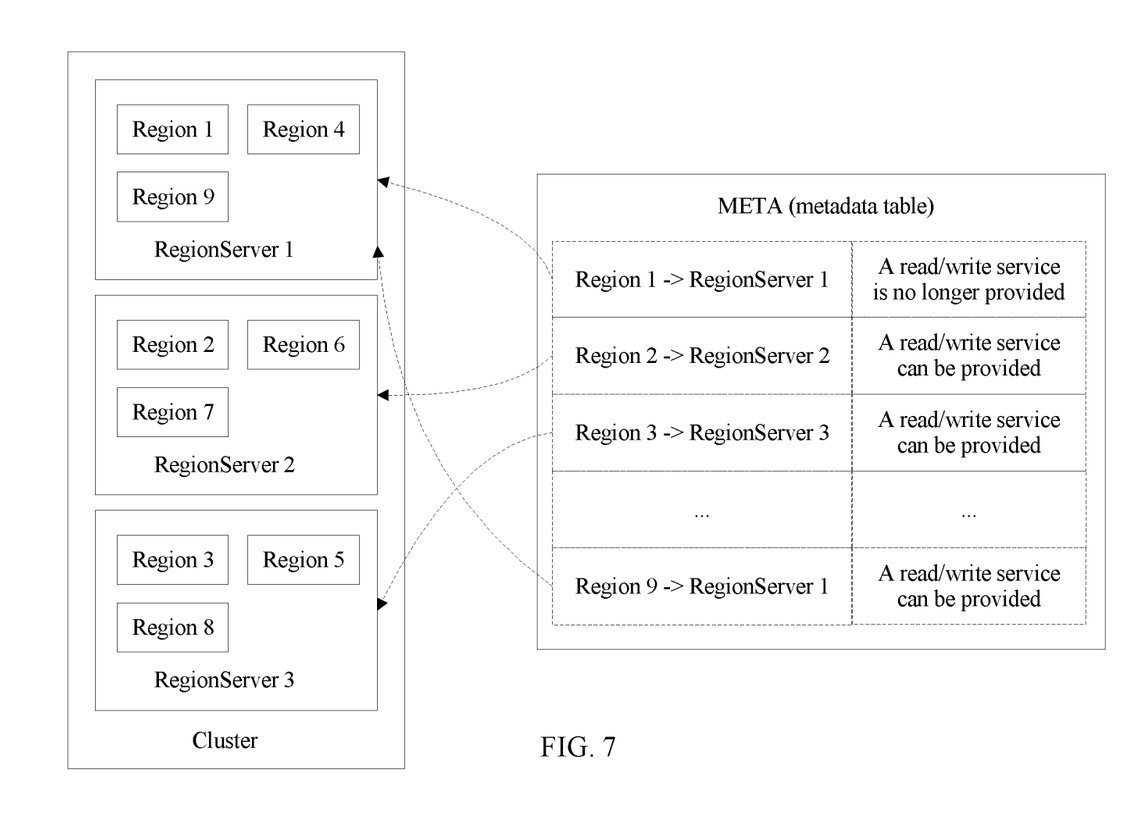
FIG. 7 is a schematic structural diagram of a metadata table.

In step S240, the metadata table (META) is a special table. The table stores routing information of regions in all user tables, that is, related information about a region node on which each region is located. FIG. 7 is a schematic structural diagram of a metadata table.

The region node instructs to record, in the metadata table, the location information of the region node on which the newly generated regions are located, so that the user can find, according to the metadata table, a location of each region that stores the new data. When the metadata table is stored in the region node that performs the method, that is, when the metadata table is stored in the region node that currently performs region splitting, the region node directly updates the metadata table. When the metadata table is stored in another region node, the region node that performs the method instructs another storage node (that is, the another region node) to update the metadata table.

According to the method for splitting a region in a distributed database provided in this embodiment of the present disclosure, the blank region is preset. When the data is to be stored in the blank region, the blank region is first split into the at least two regions according to the preset multiple split points, and then, the data is stored in the at least two newly generated regions, so that rapid region splitting is implemented, and data read/write performance is improved.

Figure 8:
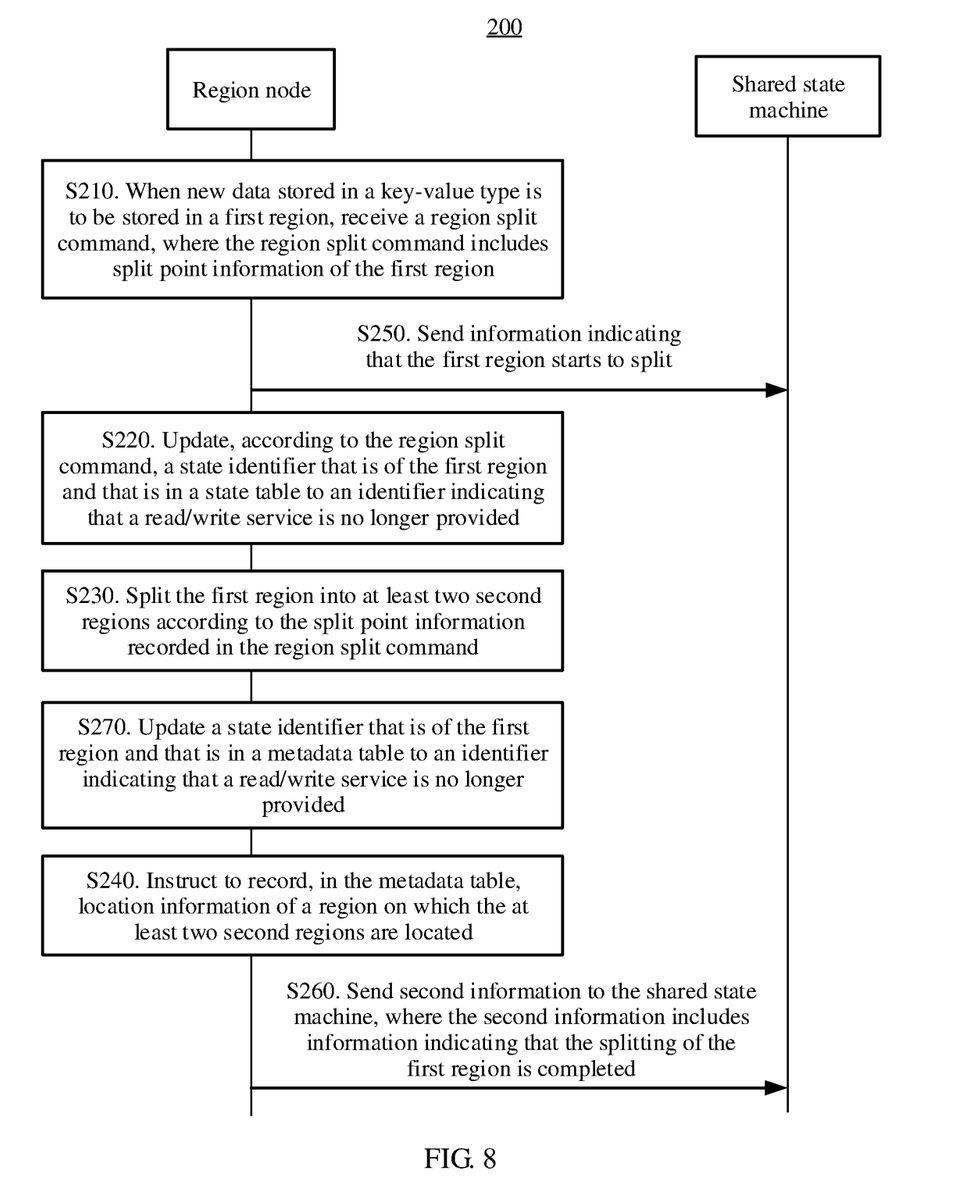
FIG. 8 is a flowchart of a method for splitting a region in a distributed database according to another embodiment of the present disclosure.
Figure 9:
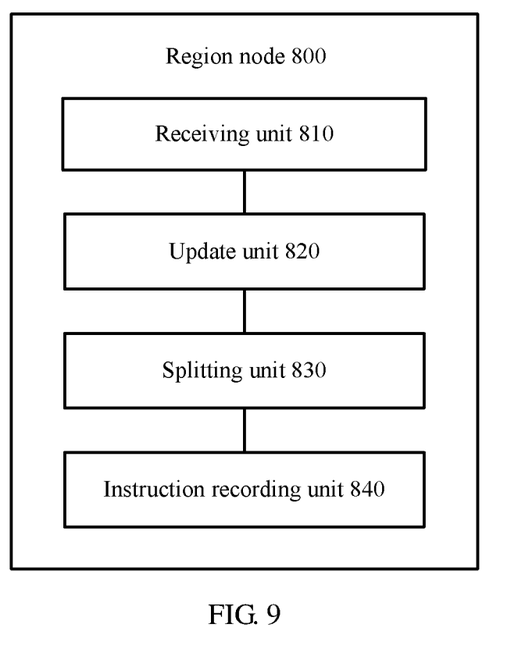
FIG. 9 is a schematic structural diagram of a region node according to an embodiment of the present disclosure.

Optionally, in another embodiment of the present disclosure, as shown in FIG. 8, when the region split command entered by the user is received, the method 200 further includes the following step.

Step S250. Send first information to a shared state machine, where the first information indicates that the first region has started to split, so that the shared state machine updates the recorded state identifier of the first region to a third identifier according to the first information. The third identifier is used to indicate that the first region has started to split.

Specifically, a management node is a node managing the region node, and one management node can manage one or more region nodes. The management node is the management node 110 in FIG. 4. The shared state machine is the shared state machine 120 in FIG. 4. The shared state machine records status information of each region. For example, the region is in a splitting state or a split state. The shared state machine may record the status information of each region in a form of a state table. Table 2 is a schematic structural diagram of a state table in a shared state machine according to this embodiment of the present disclosure.

TABLE 2

| Region | State identifier |
|---|---|
| Region 1 | Splitting |
| Region 2 | Split |

It should be understood that, in this embodiment of the present disclosure, content in Table 2 is only intended to describe the technical solution in detail, and the state identifiers in Table 2 may be indicated in another logical indication manner. For example, "0" is used to indicate the splitting state, and "1" is used to indicate the split state. This is not limited in this embodiment of the present disclosure.

It should be further understood that, in this embodiment of the present disclosure, the shared state machine records the state identifier of each region in a form of the state table. In this embodiment of the present disclosure, the shared state machine may record the status information of each region in another logical relationship form. This is not limited in this embodiment of the present disclosure.

In step S250, when receiving the region split command entered by the user, the region node sends, to the shared state machine by using the management node, the first region, that is, information indicating that the preset blank region starts to split. After receiving the information indicating that the blank region starts to split, the shared state machine changes, according to the received information, the state identifier that is of the blank region recorded in the state table in the shared state machine. The state identifier is changed into a state identifier indicating that splitting starts, for example, the state identifier "Splitting" shown in Table 2. In this way, when access to the first region is expected, a status of the first region may be clearly learned of by using the shared state machine.

Optionally, in another embodiment of the present disclosure, as shown in FIG. 8, after the first region is split into the at least two second regions, the method 200 further includes the following step.

Step S260. Send second information to the shared state machine, where the second information includes information indicating that the splitting of the first region is completed, so that the shared state machine updates the recorded state identifier of the first region to a fourth identifier according to the second information, and the fourth identifier is used to indicate that the splitting of the first region is completed.

Specifically, the first region is the blank region reserved when the user performs region division for a created user table. After splitting the blank region into the multiple new regions according to the multiple split points, the region node sends, to the shared state machine by using the management node, the information indicating that the splitting of the blank region is completed. After receiving the information indicating that the splitting of the blank region is completed, the shared state machine changes the state identifier that is of the blank region and that is recorded in the state table from "Splitting" to "Split". For example, a changed form is the state identifier of the region 2 in Table 2. In this way, during access to the first region, the status of the first region may be clearly learned of by using the shared state machine.

According to the method for splitting a region in a distributed database provided in this embodiment of the present disclosure, the blank region is preset, and when the data is to be stored in the blank region, the blank region is first split into the at least two regions according to the preset multiple split points, and then, the data is stored in the at least two newly generated regions, so that rapid region splitting is implemented, and data read/write performance is improved. In addition, before the blank region is split, the state identifier that is of the region and that is recorded in the shared state machine is changed, so that the management node in the distributed database clearly learns of the service status of the blank region, and the management node is prevented from moving the blank region node to another region node.

Optionally, in another embodiment of the present disclosure, after the first region is split into the at least two second regions, the method 200 further includes the following step.

S270. Update a state identifier that is of the first region and that is in the metadata table to the first identifier.

Specifically, the first identifier is a state identifier indicating that provision of a read/write service is not supported. When the region node splits the first region, in S220, the state identifier that is of the first region and that is in the state table in the region node is changed into the identifier indicating that provision of a read/write service is not supported, so that the region is split rapidly, and a data loss caused when data is written in a region split process is avoided. After the region splitting is completed, the state identifier of the first region that is not split is to be recorded in the metadata table as an identifier indicating that a read/write service is no longer provided. As shown in FIG. 7, the first region is the blank region reserved when the user performs region division for the created user table.

It should be understood that, in this embodiment of the present disclosure, the state identifier of each region is indicated by using "a read/write service is no longer provided" or "a read/write service can be provided" in FIG. 7. In this embodiment of the present disclosure, the state identifier that is of each region and that is recorded in the metadata table may be indicated in another logical indication manner. For example, "0" is used to indicate that provision of a read/write service is not supported, and "1" is used to indicate that provision of a read/write service is supported. This is not limited in this embodiment of the present disclosure.

It should be understood that, in this embodiment of the present disclosure, "a read/write service can be provided" and "a read/write service is no longer provided" may be respectively understood as "provision of a read/write service is supported" and "provision of a read/write service is not supported".

It should be understood that, in this embodiment of the present disclosure, the methods/steps in the method 200 described in FIG. 6 and FIG. 8 may be implemented by using the communications interface 131 and the processor 133 in FIG. 4.

It should be further understood that, in this embodiment of the present disclosure, the metadata table is stored in the region node that performs the method 200. Alternatively, the metadata table may be stored in another region node, and likewise, the technical solution may be completed according to the methods/steps described in FIG. 5 and FIG. 7 in this embodiment of the present disclosure.

FIG. 8 is a schematic structural diagram of a region node according to an embodiment of the present disclosure. As shown in FIG. 8, a first region is set according to a preset condition when data is stored in a key-value type storage manner, the first region is a blank region reserved for storing new data of a key-value type, and the region node 800 includes a receiving unit 810, an update unit 820, a splitting unit 830, and an instruction recording unit 840.

The receiving unit 810 is configured to: when the new data of the key-value type is to be stored in the first region, receive a region split command entered by a user, where the region split command includes split point information of the first region.

The update unit 820 is configured to update a state identifier that is of the first region and that is in a state table to a first identifier according to the region split command, where the first identifier is used to indicate that the first region no longer provides a read/write service.

The splitting unit 830 is configured to: split the first region into at least two second regions according to the split point information recorded in the region split command, and record state identifiers that are of the second regions and that are in the state table as second identifiers, where the second identifiers are used to indicate that the second regions can provide a read/write service.

The instruction recording unit 840 is configured to instruct to record, in a metadata table, location information of a region node on which the at least two second regions are located, so that the region node on which the second regions used to store the new data of the key-value type are located can be found according to the metadata table.

Specifically, the first region is a blank region reserved when the user performs region division. When reserving the blank region, the user may pre-estimate, according to a type of currently stored data, a key value range for data storage, so as to ensure that the currently stored data does not fall into the blank region. The second regions are new regions obtained after the region node splits the region according to the split information of the blank region and a preset split point. The metadata table is a table of a special type. The table stores routing information of regions in all user tables, that is, related information about a region node on which each region is located.

When data is to be stored in the blank region, the receiving unit 810 triggers, according to an interface or a command invoked by the user, the blank region to perform region splitting according to the preset split point, where the command is the region split command. The region split command includes the split information of the blank region. There is generally at least one preset split point, and the blank region may be split into two or more new regions. The split point is set according to a key value point for data storage.

The region node may include the state table, and the state table is used to record a status of each region in the region node. For example, the region is in a state in which provision of a read/write service is supported, or the region is in a state in which provision of a read/write service is not supported. The update unit 820 changes, according to the split information of the blank region, the state identifier that is of the blank region and that is in the state table into an identifier indicating that provision of a read/write service is not supported.

It should be understood that, in this embodiment of the present disclosure, the region node records a state identifier of each region in a form of the state table. In this embodiment of the present disclosure, the region node may record status information of each region by using another logical relationship. This is not limited in this embodiment of the present disclosure.

In this embodiment of the present disclosure, the region node changes the state identifier of the blank region into the identifier indicating that provision of a read/write service is not supported, so that a service status of the blank region is clear inside the region node.

The splitting unit 830 splits the region into the new regions according to the split point information of the blank region and the preset split point, so as to improve data read/write performance.

In this embodiment of the present disclosure, the region node records the state identifiers of the newly generated regions as identifiers indicating that provision of a read/write service is supported, so that specific service statuses of the newly generated regions are clearly learned of. This helps store the stored new data in the newly generated regions, and improves data read/write performance.

The record instruction unit 840 records, in the metadata table, the location information of the region node on which the at least two newly generated regions are located, so that data to be queried for can be found by using the location information of the region node for data storage that is recorded in the metadata table.

According to the distributed database provided in this embodiment of the present disclosure, the blank region is preset, and when the data is to be stored in the blank region, the blank region is first split into the at least two regions according to preset multiple split points, and then, the data is stored in the at least two newly generated regions, so that rapid region splitting is implemented, and data read/write performance is improved.

Figure 10:
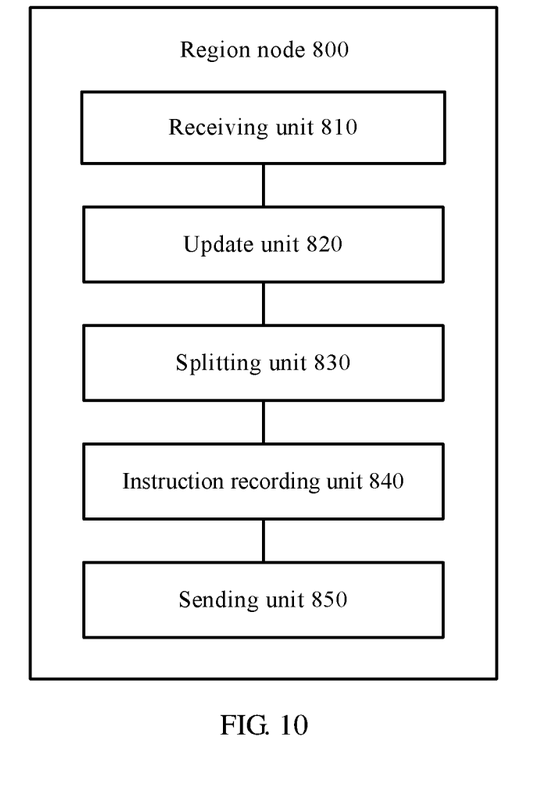
FIG. 10 is a schematic structural diagram of a region node according to another embodiment of the present disclosure.

Optionally, in another embodiment of the present disclosure, as shown in FIG. 10, the distributed database 800 further includes a sending unit 850, and the sending unit 850 is configured to send first information to a shared state machine. The first information includes information indicating that the first region starts to split, so that the shared state machine updates the recorded state identifier of the first region to a third identifier according to the first information, and the third identifier is used to indicate that the first region starts to split.

Optionally, in another embodiment of the present disclosure, the sending unit 850 is further configured to send second information to the shared state machine. The second information includes information indicating that splitting of the first region is completed, so that the shared state machine updates the recorded state identifier of the first region to a fourth identifier according to the second information, and the fourth identifier is used to indicate that the splitting of the first region is completed.

Optionally, in another embodiment of the present disclosure, the update unit 820 is further configured to update a state identifier that is of the first region and that is in the metadata table to the first identifier.

According to the method for splitting a region in a distributed database provided in this embodiment of the present disclosure, the blank region is preset, and when the data is to be stored in the blank region, the blank region is first split into the at least two regions according to the preset multiple split points, and then, the data is stored in the at least two newly generated regions, so that rapid region splitting is implemented, and data read/write performance is improved. In addition, before the blank region is split, the state identifier that is of the region and that is recorded in the shared state machine is changed, so that another region node in a distributed database clearly learns of the service status of the blank region. This avoids a data loss caused by a motion in a blank region split process.

It should be understood that, in this embodiment of the present disclosure, "a read/write service can be provided" and "a read/write service is no longer provided" may be respectively understood as "provision of a read/write service is supported" and "provision of a read/write service is not supported".

It should be noted that, in this embodiment of the present disclosure, the region node 800 according to this embodiment of the present disclosure is corresponding to an entity for executing the method 200 provided in the embodiments of the present disclosure, and the foregoing and other operations and/or functions of the modules in the region node 800 are separately used to implement corresponding procedures of the methods in FIG. 6 and FIG. 8. For brevity, details are not described herein again.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementations, the objective, technical solutions, and benefits of the present disclosure are further described in detail. It should be understood that the foregoing descriptions are merely specific implementations of the present disclosure, but are not intended to limit the protection scope of the present disclosure. Any modification, equivalent replacement, or improvement made without departing from the spirit and principle of the present disclosure shall fall within the protection scope of the present disclosure.

What is claimed is:

1. A method, comprising:
reserving, by a region node, a first region of a database, wherein the first region is blank and is not used for current data storage, the first region is reserved during current data storage for storing data of a first key-value type of a plurality of key-value types, and the first region is a first key-value range between a first key-value and a second key-value, and wherein reserving the first region of the database comprises:
pre-estimating, according to a type of currently stored data, a second key-value range, and reserving the first region to have the first key-value range according to the pre- estimating to determine that that the currently stored data does not fall into the blank first region, wherein the type of currently stored data is the first key-value type of the plurality of key-value types;
receiving, by the region node, a region split command when first data of the first key-value type is to be stored in the first region of the database, wherein the region split command comprises split point information of the first region, and the region split point information indicates at least one point located inside the blank first region to use to split the first region;
splitting, by the region node, the first region into at least two second regions according to the split point information;
after splitting the first region into the at least two second regions, storing, by the region node, the first data of the first key-value type in the at least two second regions; and
instructing, by the region node, to record, in a metadata table, location information of the region node where the at least two second regions are located, so that the region node where the second regions are located are findable according to the metadata table.

2. The method of claim 1 further comprising updating, by the region node, a state identifier of the first region in a state table to a first identifier according to the region split command, wherein the first identifier indicates that the first region no longer provides a read/write service.

3. The method according to claim 2, further comprising:
updating, by the region node, the state identifier of the first region in the metadata table to the first identifier after the splitting the first region into the at least two second regions.

4. The method of claim 1, further comprising recording state identifiers of the at least two second regions in a state table as second identifiers, wherein the second identifiers indicate that the at least two second regions provide a read/write service.

5. The method according to claim 1, wherein the method further comprises:
sending first information to a shared state machine when the region split command is received, wherein the first information indicates that the first region has started to split, and wherein the shared state machine updates a recorded state identifier of the first region to a third identifier according to the first information, and the third identifier indicates that the first region has started to split.

6. The method according to claim 1, wherein the first region is set according to a service type of data to-be-stored in the first region, wherein the first data is of the service type.

7. The method according to claim 1, wherein the split point information of the first region indicates preset split points of the first region.

8. The method according to claim 1, wherein the region split command is invoked by a user.

9. A region node, comprising:
a processor; and
a non-transitory computer readable storage medium storing programing for execution by the processor, the programing including instructions to:
reserve a first region of a database, wherein the first region is blank and is not used for current data storage, and the first region is reserved for storing data of a first key-value type of a plurality of key-value types, and the first region is a first key-value range between a first key-value and a second key-value, and wherein reserving the first region of the database comprises:
pre-estimating, according to a type of currently stored data, a second key-value range and reserving the first region to have the first key-value range according to the pre-estimating to determine that that the currently stored data does not fall into the blank first region, wherein the type of currently stored data is the first key-value type of the plurality of key-value types;
when first data of the first key-value type is to be stored in the first region, receive a region split command, wherein the region split command comprises split point information of the first region;
split the first region into at least two second regions according to the split point information;
after splitting the first region into the at least two second regions, store the first data of the first key-value type in the at least two second regions; and
instruct to record, in a metadata table, location information of the region node, so that the region node on which the at least two second regions are located can be found according to the metadata table.

10. The region node according to claim 9, wherein the instructions comprise further instructions to update a state identifier the first region in a state table to a first identifier according to the region split command, wherein the first identifier indicates that the first region no longer provides a read/write service.

11. The region node according to claim 10, wherein the instructions comprise further instructions to update a state identifier of the first region in the metadata table to the first identifier, after the first region is split into the at least two second regions.

12. The region node according to claim 9, wherein the instructions comprise further instructions to record state identifiers of the at least two second regions in a state table as second identifiers, wherein the second identifiers indicate that the at least two second regions can provide a read/write service.

13. The region node according to claim 9, wherein the instructions comprise further instructions to send first information to a shared state machine when the region split command is received, wherein the first information indicates that the first region has started to split, so that the shared state machine updates a recorded state identifier of the first region to a third identifier according to the first information, and the third identifier indicates that the first region has started to split.

14. The region node according to claim 9, wherein the first key-value type is a first service type of data of a plurality of service types of data.

15. A computer program product, comprising a non-transitory computer-readable medium storing computer executable instructions, that when executed by one or more processors, perform the operations of:

reserving a first region of a database, wherein the first region is blank and is not used for current data storage, and the first region is reserved for storing data of a first key-value type of a plurality of key-value types during current data storage, the first region is a first key-value range between a first key-value and a second key-value, and wherein reserving the first region of the database comprises:

pre-estimating, according to a type of currently stored data, a second key-value range, and reserving the first region to have the first key-value range according to the pre-estimating to determine that that the currently stored data does not fall into the blank first region, wherein the type of currently stored data is the first key-value type of the plurality of key-value types;

receiving a region split command, when first data of the first key-value type is to be stored in the first region, wherein the region split command comprises split point information of the first region, and the region split point information indicates at least one point located inside the blank first region to use to split the first region;

updating a state identifier of the first region in a state table to a first identifier according to the region split command, wherein the first identifier indicates that the first region no longer provides a read/write service;

splitting the first region into at least two second regions according to the split point information recorded in the region split command;

recording state identifiers of the at least two second regions in the state table as second identifiers, wherein the second identifiers indicate that the at least two second regions can provide a read/write service; and instructing to record, in a metadata table, location information of a region node on which the at least two second regions are located, so that the region node on which the at least two second regions are located can be found according to the metadata table.

16. The computer program product according to claim 15, wherein the operations further comprise:

sending first information to a shared state machine, when the region split command is received, wherein the first information indicates that the first region has started to split, so that the shared state machine updates the recorded state identifier of the first region to a third identifier according to the first information, and the third identifier is used to indicate that the first region started to split.

17. The computer program product according to claim 15, wherein the operations further comprise:

instructing to update a state identifier of the first region in the metadata table to the first identifier, after the splitting the first region into the at least two second regions.

18. The computer program product according to claim 15, wherein the first region is set according to a service type of data to-be-stored in the first region.

19. The computer program product according to claim 15, wherein the operations further comprise:

after splitting the first region into the at least two second regions, storing the first data in the second regions.

* * * * *

UNITED STATES PATENT AND TRADEMARK OFFICE
CERTIFICATE OF CORRECTION

| | |
|---|---|
| PATENT NO. | : 11,868,315 B2 |
| APPLICATION NO. | : 15/960167 |
| DATED | : January 9, 2024 |
| INVENTOR(S) | : Bi et al. |

It is certified that error appears in the above-identified patent and that said Letters Patent is hereby corrected as shown below:

In the Claims

In Column 13, in Claim 1, Line 27, delete "pre- estimating" and insert -- pre-estimating --.

In Column 14, in Claim 9, Line 30, delete "range" and insert -- range, --.

Signed and Sealed this
Second Day of April, 2024

Katherine Kelly Vidal
*Director of the United States Patent and Trademark Office*